United States Patent [19]

Beck et al.

[11] 4,065,608

[45] Dec. 27, 1977

[54] PROCESS FOR THE PREPARATION OF CATIONIC PAPER SIZING AGENTS

[75] Inventors: Heinz Beck, Duren; Gerhard Gabriel, Nideggen; Gunter Poppel, Duren-Niederau, all of Germany

[73] Assignee: Akzona Incorporated, Asheville, N.C.

[21] Appl. No.: 730,032

[22] Filed: Oct. 6, 1976

[30] Foreign Application Priority Data

Oct. 8, 1975 Germany ............................ 2544948

[51] Int. Cl.$^2$ ............................ C08F 8/32; C08F 8/02
[52] U.S. Cl. ................................ 526/49; 526/30; 526/41; 526/42; 526/56
[58] Field of Search ........................................ 526/49

[56] References Cited

U.S. PATENT DOCUMENTS

| | | | |
|---|---|---|---|
| 3,432,479 | 3/1969 | Verdol et al. | 526/49 |
| 3,455,827 | 6/1969 | Mehmedbasich | 526/49 |
| 3,506,625 | 4/1970 | Patinkin et al. | 526/49 |
| 3,527,804 | 9/1970 | Cyba | 526/49 |

*Primary Examiner*—William F. Hamrock
*Attorney, Agent, or Firm*—Francis W. Young; Robert F. Green

[57] ABSTRACT

A process for the preparation of cationic paper sizing agents is disclosed. A copolymer of maleic anhydride and an α-olefin containing 10 to 26 carbon atoms is first reacted with from 0.1 to 1.0 mol, per mol of anhydride, of a monoprimary/monotertiary alkylene diamine, subsequently reacting the copolymer with more than 0.2 and less than 1.5 mols, per mol of anhydride, of a low-molecular weight polyamine, with the proviso that the total amount of amine reacted be less than 2.0 mols per mol of anhydride, and converting the resultant product to a salt.

15 Claims, No Drawings

PROCESS FOR THE PREPARATION OF CATIONIC PAPER SIZING AGENTS

BACKGROUND OF THE INVENTION

This invention relates to a process for the preparation of cationic paper sizing agents. More particularly, it relates to a process for reacting a copolymer of maleic anhydride and an α-olefin, with basic nitrogen compounds, and converting the resultant product to salt.

Many synthetic agents, as well as naturally occurring substances, are known to be useful as paper sizing agents. In addition to resins and resin soaps derived from rosin, waxes and paraffins, fatty acids and their salts, and many others, numerous synthetic agents such as alkaline solutions of condensation products of formaldehyde withh phenols, melamine formaldehyde resins, as well as compounds based on diketenes, polyurethanes, and the like, are recommended as sizing agents.

Reaction products of copolymers of maleic anhydride may be used as sizing agents, as taught in U.S. Pat. No. 3,853,609. Such compounds are obtained from a copolymer of maleic anhydride and α-olefins with 4 to 6 carbon atoms, as well as ammonia. In order to obtain sizing effect with the compounds described in said patent, it is necessary to utilize relatively high concentrations of the polymer. Also, the sizing effects obtained with such compounds are not satisfactory in many respects. The sizing agents utilized in U.S. Pat. No. 3,853,609 are also anionic in nature.

Cationic compounds useful for sizing paper, which are obtained by the reaction of copolymers of maleic anhyride with basic nitrogen compounds such as amines, are described for example in German patent disclosure 1,621,688, wherein maleic anhydride homo- or copolymers are reacted with N-dialkyl aminoalkyl amines, if necessary in mixture with ammonia or primary aliphatic or cycloaliphatic monoamines and, also if necessary, converted to a salt. However, to achieve noticeable sizing activities, such agents must be blended with homo- or copolymers of olefinic, unsaturated, polymerizable monomers, or chemically modified through further reaction.

Although there are many sizing agents of varied chemical compositions, there still exists a demand for improved products having high sizing activity which display a satisfactory aging resistance and compatibility with other auxiliary agents required in the manufacture of paper. It is also desirable to have such agents which are resistant to the influence of light, possess better processing characteristics, and in particular, result in good sizing at various pH values.

DESCRIPTION OF THE INVENTION

It has now been found that cationic paper sizing agents having improved characteristics may be prepared through a process comprising first reacting in an organic solvent a copolymer of maleic anhydride and an α-olefin containing 10 to 26 carbon atoms with from 0.1 to 1.0 mols, per mol of anhydride, of a monoprimary/monotertiary alkylene diamine of the formula

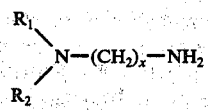

wherein $R_1$ and $R_2$ each independently represent alkyl of 1 to 22 carbon atoms or phenyl, or, when grouped with the tertiary nitrogen atom, represent piperidyl or morpholyl, and $x$ is an integer from 2 to 12; subsequently reacting the copolymerdiamine reaction product with more than 0.2 and less than 1.5 mols, per mol of anhydride, of a low-molecular weight polyamine, with the proviso that the total amount of amine reacted be less than 2.0 mols per mol of anhydride; and converting the resultant product to a salt. Preferably less than 1.1 mols of the low-molecular weight polyamine, per mol of anhydride, is utilized.

The copolymers of maleic anhydride and α-olefins containing 10 to 26 carbon atoms which are useful in the present invention, may be prepared according to known processes. Thus, maleic anhydride may be polymerized with appropriate α-olefins, such as 1-decene, 1-octadecene, 1-eicosene, in solution or in bulk, and making use of appropriate catalysts or catalyst systems. Use may also be made of customary catalysts, such as peroxides, azobis (isobutyric nitrile), or other redox catalyst systems customarily used in radical polymerization. The ratio of maleic anhydride to α-olefin may be varied within relatively wide limits. Preferably, in the preparation of the copolymer employed pursuant to the invention, use is made of maleic anhydride and α-olefin in the molar ratio of 0.9:1 to 1.8:1, preferably in the range from 1:1 to 1.5:1. It is also preferably to use α-olefins containing 16 to 26 carbon atoms. If the copolymerization of the maleic anhydride with the α-olefin results in a product which still contains unconverted α-olefin, such unconverted α-olefin may be removed if necessary. However, in many cases, the presence of the unconverted α-olefin does not disturb the further reactions of this invention, and the effectiveness of the products prepared therefrom is not materially affected.

If a solvent is utilized in the copolymerization of the maleic anhydride with the α-olefin, such solvent may be removed before further reactions of this invention are carried out. However, in many cases it is possible the same solvent for the copolymerization and for the further reactions with the amines in accordance with the process of this invention. The molecular weights of the copolymers may vary within a relatively wide range. Operable results may be obtained with copolymers having a molecular weight distribution of from about 2,000 to about 200,000, and the average molecular weight may also vary within wide ranges. A molecular weight distribution of the polymers can, of course, be determined with the aid of gel chromatography.

The reaction of the maleic anhydride/α-olefin copolymer with the monoprimary/monotertiary alkylene diamine is carried out in a solvent. The solvent should be an organic liquid in which the copolymer, as well as the diamine, are at least soluble to an appreciable extent. Hydrocarbons are especially useful as such solvents, and aromatic hydrocarbons, such as toluene and xylene, are especially preferred.

The monoprimary/monotertiary diamines are employed in the present invention in an amount of 0.1 to 1.0 mol, per mol of anhydride groups in the copolymer. Examples of suitable diamines with alkyl substitutents are N,N-dimethylpropylenediamine, N,N-dimethylethylenediamine, N,N-dihexylpropylenediamine, and N,N-dioctadecylpropylenediamine. Diamines with aromatic substituents, such as N,N-diphenylpropylenediamine are also suitable.

The alkylene chain located between the two amino nitrogen atoms contains from 2 to 12 carbon atoms. In addition, diamines which have had one or more methylene groups replaced by oxygen, sulfur, or mono-substituted nitrogen, may also be employed. Preferably, in the reaction of the copolymer with the monoprimary/monotertiary diamine, the diamine is employed at a molar ratio of diamine to maleic anhydride groups in the copolymer of 0.2 to 0.6.

In one embodiment of the present process, up to 70 mol percent the monoprimary/monotertiary alkylene diamine is replaced by an aliphatic monoamine of the formula, $CH_3(CH_2)_z-NH_2$, wherein $z$ is an integer from 0 to 17. Examples of monoamines which are useful in the present process are compounds such as methylamine, ethylamine, butylamine, stearylamine, cyclohexylamine, benzylamine, and the like.

As previously indicated, the reaction product of the copolymer and a monoprimary/monotertiary diamine is reacted with more than 0.2 and less than 1.5 mols, per mol of anhydride, of a low-molecular weight polyamine. The polyamine useful in the present process contain at least two amino groups, which may be primary, secondary, or a combination thereof. Examples of especially useful low-molecular weight polyamines are diprimary, aliphatic diamines, such as ethylenediamine, hexamethylenediamine, propanediamine, trimethylhexamethylenediamine, and the like. In addition, use may also be made of diamines containing hetero atoms, such as oxygen, sulfur, or mono-substituted nitrogen, in the aliphatic chain. Especially useful polyamines are also lower-molecular polyalkylenepolyamines such as diethylenetriamine, tetraethylenepentamine, triethylenetetramine, and bis,6-aminohexylamine.

The reaction of the copolymer with the monoprimary/monotertiary diamine, as well as the subsequent reaction with polyamines, may be carried out in the presence of an aliphatic hydroxy amine. Alternatively, the monoprimary/monotertiary diamine may be first reacted with the copolymer, the hydroxy amine may then be added to the resultant product, followed by reaction with the polyamine. An especially suitable aliphatic hydroxy amine is ethanolamine. The ethanolamine functions both as a reactant in the reaction and as a solvent for the copolymer. Other especially suitable aliphatic hydroxy amines are, for example, aminopropanol, or aminobutanol.

The exact chemical mechanism of the described reactions is not completely clear. It is probable that the amino groups partially react to form amides, and at least to some extent, imides are also formed. Additionally, at least a certain amount of cross-linking also takes place. It is, therefore, possible that a polyamine first forms an amide bond with a copolymer which has already reacted with the primary/tertiary diamine, with the first amine function of the polyamine reacting. An additional amino group of the polyamine may then react with an additional molecule of the reacted copolymer, resulting in cross-linking. It is also possible, that additional anhydride rings are split by the polyamine and the corresponding amide groups may therefore be formed. Cross-linking may also result from reamidation. The reaction products prepared in the foregoing manner display primary, secondary, and tertiary nitrogen atoms which may be utilized in the formation of salt, resulting in the cationic sizing agent. Transformation to a salt may be accomplished with acids, such as acetic acid, hydrochloric acid, sulfuric acid, and other organic or inorganic acids. Salt formation may also be accomplished by quaternizing or alkylating, by customary means. Alkylating agents such as dimethylsulfate may be employed for such a purpose. The salt formation may be accomplished in whole or in part. Thus all or a part of the available amino groups may be neutralized with acid, quaternized, alkylated, or subjected to a combination of the foregoing processes. The polymeric products containing nitrogen may also be mixed with an excess of acid. The solubility, or dispersibility, of the cationic products may be controlled by varying the degree of neutralization, alkylation, or quaternization. The characteristics of the resulting sizing agents may also be influenced by the number of tertiary nitrogen atoms in the resulting polymeric molecule.

It was especially surprising that, pursuant to the invention, cationic paper sizing agents with outstanding characteristics are obtained in such a simple manner through the reaction of certain copolymers of $\alpha$-olefins and maleic anhydride with monoprimary/monotertiary alkylene diamines, and the subsequent reaction with polyamines, followed by salt formation. For example, if only amino hydroxy compounds, such as ethanolamine, are used instead of the polyamines, one obtains no, or only a very small degree of sizing effect. It has also been found that the advantages of the present invention will not be achieved if monoamines are employed in the place of polyamines.

As previously indicated, the product of the present invention, when converted to a salt, may contain certain constituents of tertiary, secondary, and primary amino groups. It is desirable that the product which is to be converted to a salt, contain 0.2 to 0.8 primary amino, 0.1 to 2.9 secondary amino, and 0.3 to 1.3 tertiary amino mol equivalents per gram of solid substance. Typically, such a product contains 0.49 primary amino, 0.74 secondary amino, and 0.77 tertiary amino mol equivalents per gram of solid substance before it is transformed to a salt, as by means of neutralization with acid, quaternization, alkylation, or a combination thereof. The number of the various amino groups may be determined by means of known analysis methods, such as that described in Siggia, "Quantitative Organic Analysis via Functional Groups", 3rd edition, John Wiley and Sons, New York, 1963, at Chapter 11.

The cationic compounds prepared pursuant to the present invention are excellent sizing agents for paper, and may be used for surface sizing, as well as for purposes of mass sizing. The compounds are excellently compatible with the usually auxiliary agents used in paper sizing. It was especially surprising to find that the compounds also display sizing activity in a wide pH range. The compounds may also be used for sizing in the presence or absence of aluminum salts.

The preparation of the sizing agents pursuant to the present invention is especially simple. In particular, the process makes it possible to obtain valuable sizing agents from inexpensive, easily accessible, raw materials. The sizing activity of the sizing agents resulting from the present invention is very good in small quantities and results in a very high sizing effect. The sizing agents may be employed as solutions or dispersions, are very stable, and may be stored for long periods of time.

The following examples are presented as illustrative of the invention. It is not intended that the invention should be limited to the specific embodiments illustrated therein.

EXAMPLE I 380 grams of octadecene were heated with 50 ml of butylacetate to 35° C and then mixed with 2.5 ml of t-butylhydroperoxide. A warm solution (40° to 60° C) of 147 grams maleic anhydride and 2.5 ml t-butylhydroperoxide in 200 ml butylacetate was added dropwise within 2.5 hours. After termination of the addition, another 2.5 ml of t-butylhydroperoxide were added and the mixture stirred for four hours at 135° C. Thereupon, the butylacetate was distilled off under a water jet vacuum and the unreacted olefin was distilled off under a pump vacuum of 0.01 mm mercury.

Elementary analysis of the product showed an oxygen content of 16%, 0.333 mol of anhydride per 100 grams, or a ratio of olefin:maleic anhydride of 1:1.317. Gel-chromatographic determinations showed an average molecular weight of 14,000.

352 grams of the copolymer were dissolved in 1.6 times the quantity of xylene and then mixed with one mol N,N-dimethylpropylenediamine and one mol of hexanediamine was added after about 5 minutes. 1.5% of p-toluenesulfonic acid, calculated on the basis of the polymer, was used as catalyst. After boiling for thirty minutes with reflux and removal of the water of reaction, the solvent was mixed in a rotary evaporator. The remaining resin was removed with acetic acid and dissolved in water.

In a sizing press, the cationic product, together with a 5% starch solution, was applied to unsized paper of 80 gram per cm² with a porosity of 1100 to 1200 ml per minute and an absorption weight of 150 (ml of water) (according to Bendtsen), in a surface sizing operation. Papers with the following characteristics were obtained thereby:

Table

| Quantity of Sizing Agent Used Per Paper Weight | °Cobb | Ink (sec.) Hercules Sizing Tester (80% Reflectance) |
|---|---|---|
| % (Absolute Dry) | | sec. |
| 0.2 | 25.0 | 560 |
| 0.3 | 25.0 | 640 |
| 0.4 | 18.0 | 1,300 |

EXAMPLE II 3,252 grams eicosene were mixed with 923 grams butylacetate and heated to 130° C under nitrogen. Then, 1,078 grams maleic anhydride and 50 ml t-butylhydroperoxide were added within 2.5 hours in five batches each. After an additional half an hour, another 216 of grams maleic anhydride and 25 ml hydroperoxide were added and boiled for an additional four hours with reflux. Subsequently, the solvent and the excess olefin were distilled off under a vacuum. A polymer remained behind, which still contained 1.4% excess olefin.

100 grams of the above polymer were dissolved in 150 grams of xylene, 0.4 grams of p-toluene sulfonic acid was added and the mixture heated to boiling. 9.5 grams N,N-dimethylpropanediamine, 4.3 grams ethanolamine and 11.9 grams diethylenetriamine were added at intervals of five minutes each and subsequently the liquid was boiled for half an hour under reflux. The water of reaction was then removed by azeotroping with xylene and the solvent distilled off on a water bath in a water jet vacuum. The remaining resin was dissolved with acetic acid in water.

As in Example I, 0.2% of the sizing agent was used at different pH values of the baths whereby the following results were obtained:

| pH Value | °Cobb On Top | Towards Screen |
|---|---|---|
| 4.0 | 18.8 | 20.2 |
| 7.0 | 18.8 | 20.7 |
| 9.0 | 22.4 | 20.7 |

EXAMPLE III 701.5 grams 1-decene are diluted with 238 grams of xylene and, as in the Example above, polymerized with a total of 490 grams of maleic anhydride and 11 ml t-butylhydroperoxide, except that the solvent was not removed after polymerization, but was diluted with xylene to a dry content of 27.5%. 152 grams of the resulting solution are diluted with another 450 grams of xylene, mixed with 0.3 grams p-toluene sulfonic acid, and, at intervals of five minutes each, 10.3 grams N,N-dimethylpropanediamine, 15.3 grams ethanolamine and 51.5 grams diethylenetriamine are added while boiling. After boiling for an additional half hour, everything miscible with xylene is removed by azeotroping and the solvent removed on the water bath in a water jet vacuum. As above, the remaining resin is neutralized with acetic acid, dissolved in water, and used for surface sizing. When using a quantity of 0.3%, one obtains a Cobb value of 25.8.

EXAMPLE IV

Example III is repeated, except that 840 grams of 1-dodecene are used instead of 1-decene; one obtains a Cobb value of 18.4.

EXAMPLE V 450 grams of an α-olefin mixture with chain lengths of $C_{20}$ to $C_{24}$ (average molecular weight = 307) were heated to 120° C under nitrogen. The stream of nitrogen was then turned off, 3.6 ml of t-butylhydroperoxide were added and a mixture of 205.8 grams maleic anhydride and 150 grams of butyl acetate was added dropwise within 1.5 hours. During this time, and in the three hours following, 1.1 ml of t-butylhydroperoxide was added every half hour. After that, the temperature was increased to 150 to 160° C and held thereat for another one and a half hours, during which time another two batches of 1.1 ml each of t-butylhydroperoxide were added at an interval of half an hour. Subsequent to that, the butylacetate was distilled off, ultimately under a vacuum, and 1200 grams of xylene were added. The solution contains 36.3% solid substance, of which 33.6% consists of polymer and 2.7% of unconverted olefin. A wide molecular weight distribution of 2,000 to 55,000, with a peak at 12,000, was determined by means of GPC. 590 grams of the above solution were heated to boiling, whereupon 0.4 grams p-toluene sulfonic acid and 16.7 grams of N,N-dimethylpropanediamine were added. Five minutes thereafter, 20.7 grams of benzylchloride were added dropwise and, after another ten minutes, 7.5 grams of ethanolamine and 20.9 grams of diethylenetriamine were added as well. After another half an hour, the water of reaction was removed by azeotroping, and the xylene was removed by employing a bath of boiling water with a water jet vacuum. Adding acetic acid, the residual mass was processed into a 16% solution in water. As in Example I, 0.2% of the sizing agent was used. The paper treated in this way displayed a Cobb value of 26.0.

EXAMPLE VI 2670 grams of a $C_{20}$-α-olefin were mixed with 800 grams of xylene, the reaction vessel flushed for five minutes with nitrogen, and heated to 140° C. Subsequently, 177 grams of maleic anhydride and 41 ml of t-butylhydroperoxide were added in five batches within 2.5 hours. After another half an hour, 21 ml of additional t-butylhydroperoxide were added, whereupon the mixture was kept at 145° to 155° C for another four hours, followed by diluting with 1,724 grams of xylene. The solution contained 6.5% of unconverted olefin and 54.4% of a polymer, the molecular weight distribution of which was from 2,000 to 71,000 and displayed a peak at 6,800 (GPC).

348 grams of the above solution were diluted with 177 grams of xylene and 0.4 grams of p-toluene sulfonic acid were added. The mixture was heated until it boiled slightly, whereupon, at intervals of five minutes each, 10.2 grams of N,N-dimethylpropanediamine, 15.3 grams of ethanolamine and 20.6 grams of diethylenetriamine were added drop by drop. This was followed by boiling for another half hour, whereupon the water of reaction was removed by azeotroping. The xylene was distilled off by employing a water bath and a vacuum, and the remaining resin was processed with addition of acetic acid to form a solution in water containing 8% solid substance.

As in Example I, sizing was carried out with different quantities, whereby the following Cobb values were obtained:

| Quantity Used (Solid Substance) % | ° Cobb |
|---|---|
| 0.2 | 67.2 |
| 0.3 | 23.0 |
| 0.4 | 18.9 |

EXAMPLE VII

Condensation of the α-olefin copolymer with amine was repeated as in Example VI, with the difference that the quantity of diethyltriamine was increased to 25.8 grams.

The following data were obtained after sizing in the manner as described above:

| Quantity Used (Solid Substance) % | ° Cobb |
|---|---|
| 0.2 | 21.7 |
| 0.3 | 18.8 |
| 0.4 | 18.0 |

EXAMPLE VIII

As above, 3,256 grams of a $C_{20}$ α-olefin were polymerized with 1,078 grams of maleic anhydride in xylene. The formed polymer contained 4.2% of unconverted olefin. The molecular weight distribution reached from 2,000 to 1,111,000 and displayed a peak at 11,000 (GPC). After dilution with xylene, a solution containing 48% solid substance was obtained. 411 grams of this solution were mixed with 84 grams of xylene and 0.4 grams of p-toluene sulfonic acid, whereupon, as in the previous examples, 15.3 grams N,N-dimethylpropanediamine, 12.2 grams of ethanolamine and 20.6 grams of diethyltriamine were added one after the other, followed by removal of the water of reaction formed thereby. After evaporation of the xylene in a vacuum on the water bath, the remaining resin was, as in the previous examples, dissolved in water and used for the sizing of paper. The following Cobb values were obtained:

| Quantity Used (Solid Substance) % | ° Cobb |
|---|---|
| 0.2 | 47.5 |
| 0.3 | 20.3 |
| 0.4 | 19.5 |

EXAMPLE IX 740 grams of eicosene were diluted with 200 grams of xylene and heated to 120°, followed by the addition of 245 grams maleic anhydride and 17 ml t-butylhydroperoxide in ten batches within five hours. The temperature was thereby kept between 120 and 125° C. This was followed by an increase in temperature to 150° to 160° C and addition at intervals of half an hour each of another three lots of t-butylhydroperoxide of 1.7 ml each. Half an hour after the last addition, the mixture was diluted with 750 grams of xylene. 382 grams of this solution were heated to 120° and mixed with 0.4 grams of p-toluene sulfonic acid and 122 grams of ethanolamine. A clear solution was obtained after brief boiling. Thereupon, 15 grams of N,N-dimethylpropylenediamine and 15 grams of diethylenetriamine were added at boiling, following by removal of the excess amine, together with the water of reaction after five minutes. The xylene was distilled off on the boiling water bath in a water jet vacuum. The remaining resin was neutralized with acetic acid as in the previous examples and dissolved in water, after which it was used for surface sizing. With a used quantity of 0.3% (absolute dry), one obtains a Cobb value of 21.3.

What is claimed is:

1. A process for preparing cationic paper sizing agents comprising first reacting in an organic solvent a copolymer of maleic anhydride and an α-olefin containing 10 to 26 carbon atoms, said copolymer having a molar ratio of maleic anhydride to α-olefin of from 0.9:1 to 1.8:1, with from 0.1 to 1.0 mole per mole of anhydride, of a monoprimary/monotertiary alkylene diamine of the formula,

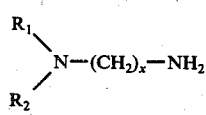

wherein $R_1$ and $R_2$ each independently represent alkyl having from 1 to 22 carbon atoms or phenyl, or, when grouped with the tertiary nitrogen atom, represent piperidyl or morpholyl, and $x$ is an integer from 2 to 12; subsequently reacting the copolymer-diamine reaction product with more than 0.2 and less than 1.5 moles, per mole of the originally present anhydride, of a low-molecular weight polyamine, said polyamine containing at least two amino groups which are primary, secondary, or a combination thereof, with the proviso that the total amount of amine reacted be less than 2 moles per mole of originally present anhydride; and converting the resultant product to a salt.

2. The process of claim 1 wherein the copolymerdiamine reaction product is reacted with more than 0.2 and less than 1.1 moles, per mole of anhydride, of a low molecular weight polyamine.

3. The process of claim 1 wherein the copolymer has a molar ratio of maleic anhydride:α-olefin of from 1.0:1.0 to 1.5:1.0.

4. The process of claim 1 wherein the α-olefin contains from 16 to 26 carbon atoms.

5. The process of claim 1 wherein the polyamine is a diprimary aliphatic diamine containing from 2 to 12 carbon atoms.

6. The process of claim 1 wherein the polyamine is a polyalkylene polyamine.

7. The process of claim 6 wherein the polyalkylene polyamine is diethylenetriamine.

8. The process of claim 1 wherein the copolymer is reacted with from 0.4 to 0.6 mole, per mole of anhydride, of the monoprimary/monotertiary diamine.

9. The process of claim 1 further characterized by the fact that the reaction with the monoprimary/monotertiary alkylene diamine or the reaction with the polyamine or both, is carried out in the presence of a hydroxy amine.

10. The process of claim 9 wherein the hydroxy amine is ethanolamine.

11. The process of claim 1 further characterized by the addition of up to 0.7 mole, per mole of originally present anhydride, of hydroxy amine, after the reaction with the monoprimary/monotertiary diamine.

12. The process of claim 11 wherein the hydroxy amine is ethanolamine.

13. The process of claim 1 further characterized by the fact that up to 70 mole percent of the monoprimary/monotertiary diamine is replaced by an aliphatic monoamine of the formula $CH_3(CH_2)_z\text{-}NH_2$, wherein $z$ is an integer from 0 to 17.

14. The process of claim 1 wherein the resultant product prior to conversion to a salt, contains from 0.2 to 0.8 mole of primary amino, 0.1 to 2.9 moles of secondary amino, and 0.3 to 1.3 moles of tertiary amino groups per gram of solid substance.

15. The process of claim 1 wherein the resultant product is converted to a salt by reaction with an acid, an alkylating agent, or a combination thereof.

* * * * *